United States Patent
Morimoto

(10) Patent No.: US 9,812,911 B2
(45) Date of Patent: Nov. 7, 2017

(54) DC MOTOR

(71) Applicant: ASMO Co., Ltd., Shizuoka-ken (JP)

(72) Inventor: Toshihiro Morimoto, Kosai (JP)

(73) Assignee: ASMO CO., LTD., Shizuoka-ken (JP)

( * ) Notice: Subject to any disclaimer, the term of this patent is extended or adjusted under 35 U.S.C. 154(b) by 294 days.

(21) Appl. No.: 14/841,112

(22) Filed: Aug. 31, 2015

(65) Prior Publication Data

US 2016/0072345 A1    Mar. 10, 2016

(30) Foreign Application Priority Data

Sep. 4, 2014    (JP) .................................. 2014180229

(51) Int. Cl.
| | | |
|---|---|---|
| *H02K 1/24* | (2006.01) | |
| *H02K 3/18* | (2006.01) | |
| *H02K 13/04* | (2006.01) | |
| *H02K 23/36* | (2006.01) | |
| *H02K 23/40* | (2006.01) | |

(52) U.S. Cl.
CPC .................. *H02K 1/24* (2013.01); *H02K 3/18* (2013.01); *H02K 13/04* (2013.01); *H02K 23/36* (2013.01); *H02K 23/40* (2013.01)

(58) Field of Classification Search
CPC ............ H02K 1/24; H02K 3/18; H02K 13/04; H02K 23/36; H02K 23/40
See application file for complete search history.

(56) References Cited

U.S. PATENT DOCUMENTS

| | | | | |
|---|---|---|---|---|
| 4,038,575 A | * | 7/1977 | Nordebo | H02K 19/24 310/179 |
| 4,260,925 A | * | 4/1981 | Barrett | H02K 1/165 310/216.095 |
| 4,591,766 A | * | 5/1986 | Takaba | H02K 1/165 310/216.095 |
| 4,935,653 A | * | 6/1990 | Cheng | H02K 1/165 310/184 |
| 8,013,491 B2 | * | 9/2011 | Krauth | H02K 1/165 310/184 |
| 8,350,437 B2 | | 1/2013 | Doushita et al. | |
| 9,252,636 B2 | * | 2/2016 | Kawai | H02K 3/00 |
| 2006/0220489 A1 | * | 10/2006 | Osawa | H02K 23/28 310/198 |
| 2011/0050025 A1 | | 3/2011 | Doushita et al. | |

FOREIGN PATENT DOCUMENTS

JP    2011-055655 A    3/2011

* cited by examiner

*Primary Examiner* — Ramon M Barrera
(74) *Attorney, Agent, or Firm* — Patterson Thuente Pedersen, P.A.

(57) ABSTRACT

A DC motor includes a core, two bifurcated branching portions, an inner coil, and an outer coil. The core includes teeth. Each tooth includes a distal end and a basal end. The branching portions are located at the distal end. The inner coil is wound around the basal end. The outer coil is wound around each of the branching portions of the tooth and a branching portion of an adjacent one of the teeth. The inner coil and the outer coil each have a number of turns that is adjusted so that an inductance of the inner coil conforms to an inductance of the outer coil.

5 Claims, 2 Drawing Sheets

DC MOTOR

RELATED APPLICATIONS

This present application claims priority to Japanese Patent Application No. 2014-180229 filed Sep. 4, 2014, said application being fully incorporated herein by reference in its entirety.

FIELD OF THE INVENTION

The present invention relates to a DC motor including two layers of armature coils wound around the teeth of an armature core in a radial direction.

BACKGROUND OF THE INVENTION

One type of a DC motor uses a double-layer structure armature coil that includes an inner layer coil and an outer layer coil. An armature core includes teeth, each having a distal end that is bifurcated into two branching teeth. The inner layer coil is wound around a basal end of each tooth. The outer layer coil is wound around the branching teeth of adjacent ones of the teeth.

In such a DC motor, the double-layer structure armature coil obtains sufficient torque and reduces vibration without enlarging the motor. Japanese Laid-Open Patent Publication No. 2011 55655 discloses a DC motor that includes an armature coil having a double-layer structure. In the DC motor disclosed in the above publication, due to the double-layer structure of the armature coil, the inductance of the coil is reduced to one-fourth when the number of turns is the same as that of a concentrated winding armature coil having a single-layer structure.

However, the inductance of the inner layer coil is larger than that of the outer layer coil. Thus, larger sparks are generated between a brush and a rectifier segment when the brush is separated from the inner layer coil through the rectifier than when the brush is separated from the outer layer coil through the rectifier.

This increases the abrasion caused by the sparks at the connected segment when the brush is separated from the inner layer coil. Thus, steps are formed in a circumferential direction in the rectifier. As a result, the life of the brush is shortened, and electromagnetic noise is easily generated.

SUMMARY OF THE INVENTION

It is an object of the present invention to provide a DC motor that limits spark abrasion, which would shorten the life of the brush, without changing the output characteristics. To achieve the above object, a DC motor according to one aspect of the present invention includes a core, two bifurcated branching portions, an inner coil, and an outer coil. The core includes teeth. Each tooth includes a distal end and a basal end. The branching portions are located at the distal end. The inner coil is wound around the basal end. The outer coil is wound around each of the branching portions of the tooth and a branching portion of an adjacent one of the teeth. The inner coil and the outer coil each have a number of turns that is adjusted so that an inductance of the inner coil conforms to an inductance of the outer coil.

In this structure, the inductance of the inner coil conforms to the inductance of the outer coil.

It is preferred that the inner coil generate a first magnetic path including a first gap that extends between adjacent ones of the teeth and that the outer coil generate a second magnetic path including a second gap that extends between the two branching portions and a third gap that extends from the branching portions to a stator. It is also preferred that the third gap be longer than the first gap and the second gap and that the inner coil have fewer turns than the outer coil.

In this structure, the inner coil has fewer turns than the outer coil so that the inductance of the inner coil conforms to the inductance of the outer coil.

It is preferred that the inner coil have a decreased number of turns and the outer coil have an increased number of turns.

In this structure, the inner coil has a decreased number of turns and the outer coil has an increased number of turns so that the inductance of the inner coil conforms to the inductance of the outer coil.

It is preferred that the decreased number of turns of the inner coil be equal to the increased number of turns of the outer coil.

In this structure, the inductance of the inner coil conforms to the inductance of the outer coil, and the output characteristics of the DC motor is retained.

It is preferred that the DC motor further include an armature. It is also preferred that the armature include the core and a rectifier that includes a segment connected to the inner coil and a segment connected to the outer coil and that the stator include a brush that slides in contact with the rectifier and supplies direct current to the inner coil and the outer coil.

In this structure, when direct current is supplied from the brush through the rectifier to the inner coil and the outer coil, the sparks generated between the brush and the segment have the same size.

DETAILED DESCRIPTION OF THE DRAWINGS

Figure 1:
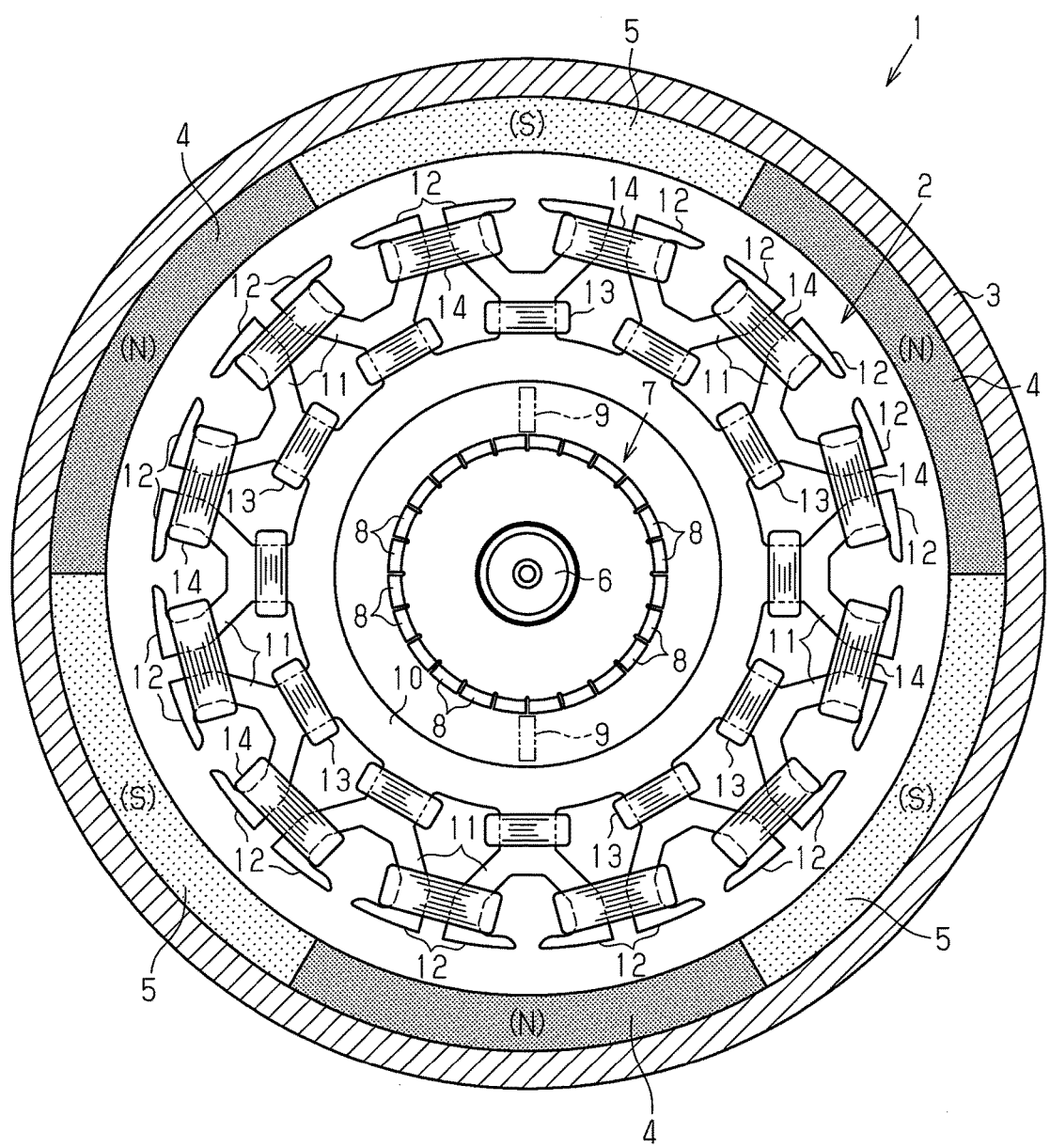
FIG. 1 is a cross-sectional view showing a DC motor according to one embodiment of the present invention.

One embodiment of a DC motor will now be described with reference to the drawings. A DC motor shown in FIG. 1 includes a stator 1 and an armature 2, which is supported to be rotatable at the inner side of the stator 1. The stator 1 includes a cylindrical yoke housing 3. The stator 1 also includes three N-pole magnets 4 and three S-pole magnets 5, which are arranged on the inner circumferential surface of the yoke housing 3. The three N-pole magnets 4 and the three S-pole magnets 5 are alternately arranged in a circumferential direction and form six magnetic poles.

The armature 2 includes a rotation shaft 6, which is located at the center of the yoke housing 3 in the radial direction. The two ends of the rotation shaft 6 are supported by the yoke housing 3 to be rotatable. A rectifier 7 is arranged at one end of the rotation shaft 6 and located in the yoke housing 3. The rectifier 7 rotates integrally with the rotation shaft 6. The rectifier 7 includes twenty-four segments 8, which are arranged at equal intervals in the circumferential direction.

Two brushes 9 are arranged at opposite sides of the rotation shaft 6 near the rectifier 7. Each brush 9 includes a distal end that slides in contact with the rectifier 7. Direct current supplied from an external device is supplied from the brushes 9 sequentially to the segments 8 when the segments 8 oppose the brushes 9.

The axially middle portion of the rotation shaft 6 includes a core 10, which rotates integrally with the rotation shaft. The core 10 includes twelve teeth 11, which extend toward the inner circumferential surface of the yoke housing 3. The twelve teeth 11 are arranged at equal intervals. Each tooth 11 includes a distal end bifurcated into two branching portions 12.

Figure 2:
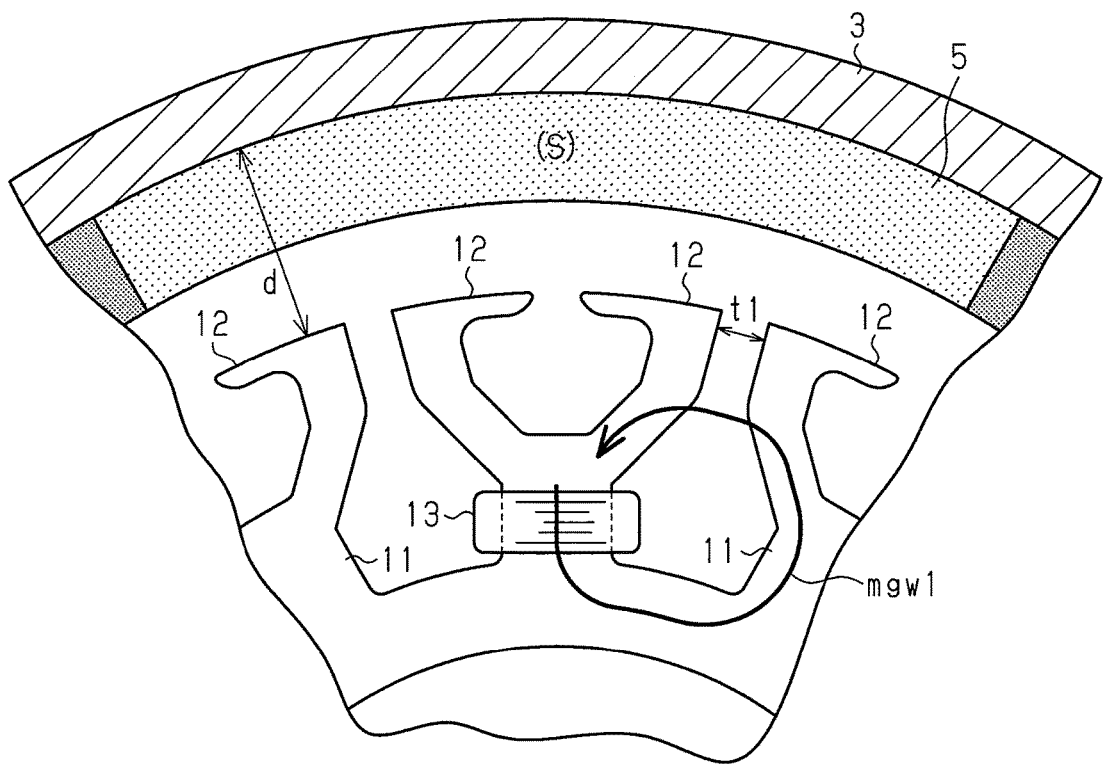
FIG. 2 is a diagram of a magnetic path generated in an inner coil shown in FIG. 1.
Figure 3:
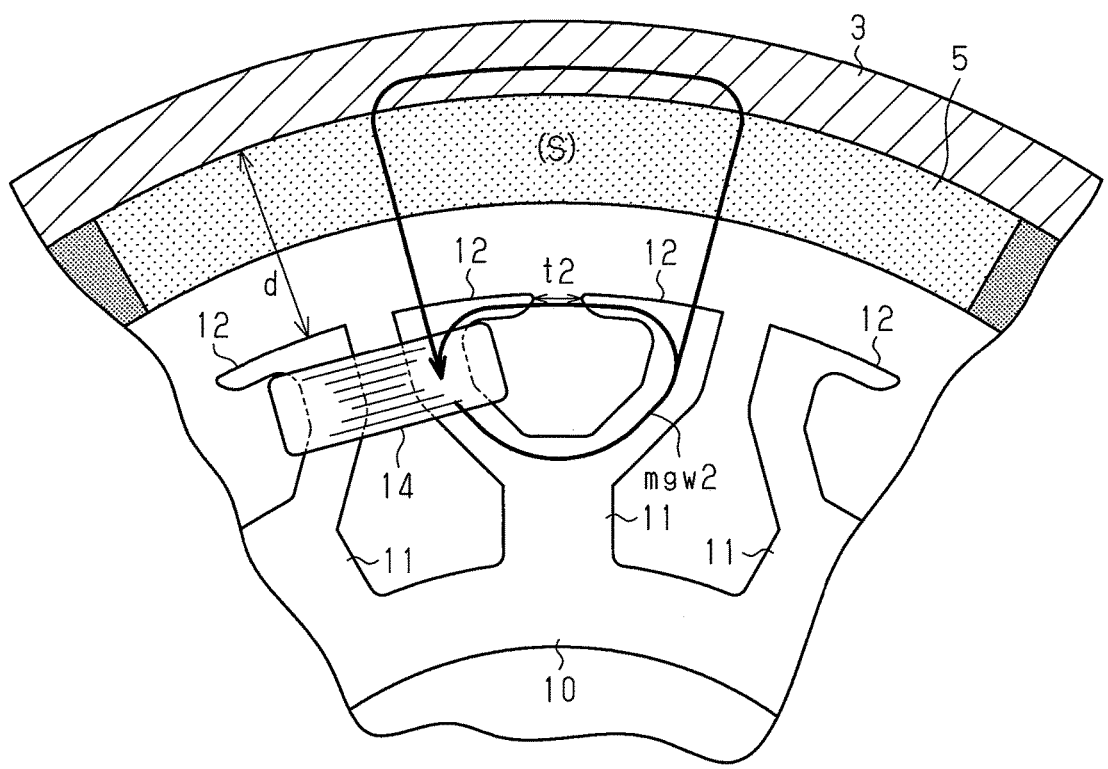
FIG. 3 is a diagram of a magnetic path generated in an outer coil shown in FIG. 1.

The branching portions 12 of each tooth 11 include distal ends that extend toward each other. As shown in FIGS. 2 and 3, a first gap t1 between a branching portion 12 of each tooth and a branching portion 12 of the adjacent teeth 11 is equal to a second gap t2 between the branching portions 12 of each tooth 11. In the present embodiment, the first gap t1 and the second gap t2 are each set to 3 mm.

A third gap d extends between the inner circumferential surface of the yoke housing 3 and the branching portions 12 of each tooth 11. The third gap d is longer than the first gap t1 and the second gap t2. In the present embodiment, the distance of the third gap d is set to 4.7 mm.

A double-layer structure armature coil is wound around each tooth 11. An inner coil 13 is wound around the distal end of the tooth 11 in concentrated windings. An outer coil 14 is wound between a branching portion 12 of the tooth 11 and a branching portion 12 of the adjacent tooth 11 in distributed windings.

The inner coils 13 and the outer coils 14 are connected to corresponding ones of the segments 8 in the rectifier 7. When direct current is supplied to the brushes 9, the direct current supplied to the inner coils 13 and the outer coils 14 rotates the armature 2.

The inner coil 13 has fewer turns than the outer coil 14. As shown in FIG. 2, a first magnetic path mgw1, which is generated when direct current flows through the inner coil 13, includes the first gap t1, which is a three-millimeter air layer.

A second magnetic path mgw2, which is generated when direct current flows through the outer coil 14, includes two magnetic paths extending in parallel to each other. More specifically, the second magnetic path mgw2 includes a magnetic path that includes the second gap t2, which is a three-millimeter air layer, and a magnetic path that includes the third gap d, the distance of which is the sum of the thickness of the air layer from the branching portions 12 of the teeth 11 to the inner circumferential surfaces of the magnets 4 and 5 and the radial thickness of the magnets 4 and 5. The distance of the third gap d is 4.7 mm. In other words, the distance of the third gap d is the distance from the radially outer side of each branching portion 12 to the inner circumferential surface of the yoke housing 3.

When the inner coil 13 has the same number of turns as the outer coil 14, the inductance of the inner coil 13 is larger than that of the outer coil 14. In the present embodiment, the inner coil 13 has fewer turns than the outer coil 14 to reduce the difference in inductance between the inner coil 13 and the outer coil 14. Further, the number of turns of the outer coil 14 is increased to compensate for the reduction in the number of turns of the inner coil 13.

The operation of the above DC motor will now be described.

When direct current is supplied from an external device to the brush 9, a magnetic field is generated by the direct current sequentially supplied from the segment 8 to the inner coil 13 and the outer coil 14. Further, a magnetic field is generated by the magnets 4 and 5 of the stator 1. The magnetic fields generate a rotational force in the armature 2 and rotate the rotation shaft 6.

The inductance of the inner coil 13 is substantially equal to that of the outer coil 14.

Thus, the size of the sparks generated between the brush 9 and the segment 8 connected to the inner coil 13 is substantially the same as the size of the sparks generated between the brush 9 and the segment 8 connected to the outer coil 14.

The above DC motor has the advantages described below.

(1) The DC motor includes an armature coil having a double-layer structure. The inner coil 13 has fewer turns than the outer coil 14 so that the inductance of the inner coil 13 substantially conforms to that of the outer coil 14. Thus, the sparks generated between the brush 9 and the segment 8 connected to the inner coil 13 have substantially the same size as the sparks generated between brush 9 and the segment 8 connected to the outer coil 14.

The number of turns is not simply reduced so that the inner coil 13 has fewer turns than the outer coil 14. Rather, in the present embodiment, the number of turns of the outer coil 14 is increased to compensate for the reduction in the number of turns of the inner coil 13. Such a configuration produces a relative difference between the number of turns of the inner coil 13 and that of the outer coil 14. Further, the inductance of the inner coil 13 conforms to that of the outer coil 14. Thus, the total number of turns is not reduced, and the output characteristics of the motor may be retained.

(2) The sparks have the same size. This limits the formation of steps on the surface of the segment 8, which would be caused by spark abrasion. Thus, the brush 9 and the rectifier 7 may each have an extended life.

(3) The sparks generated between the brush 9 and the segment 8 can be reduced. This reduces radio noise generated by electromagnetic noise resulting from the sparks.

It should be apparent to those skilled in the art that the present invention may be embodied in many other specific forms without departing from the spirit or scope of the invention. Particularly, it should be understood that the present invention may be embodied in the following form.

The inner coil and the outer coil may have the same inductance by reducing the number of turns in only the inner coil or by increasing the number of turns in only the outer coil.

The present examples and embodiments are to be considered as illustrative and not restrictive, and the invention is not to be limited to the details given herein, but may be modified within the scope and equivalence of the appended claims.

The invention claimed is:

1. A DC motor comprising:
   a core including teeth, wherein each tooth includes a distal end and a basal end;
   two bifurcated branching portions located at the distal end;
   an inner coil wound around the basal end; and
   an outer coil wound around each of the branching portions of the tooth and a branching portion of an adjacent one of the teeth, wherein the inner coil and the outer coil each have a number of turns that is adjusted so that an inductance of the inner coil conforms to an inductance of the outer coil.

2. The DC motor according to claim 1, wherein the inner coil generates a first magnetic path including a first gap that extends between adjacent ones of the teeth, the outer coil generates a second magnetic path including a second gap that extends between the two branching portions and a third gap that extends from the branching portions to a stator, wherein the third gap is longer than the first gap and the second gap, and the inner coil has fewer turns than the outer coil.

3. The DC motor according to claim 2, wherein the inner coil has a decreased number of turns and the outer coil has an increased number of turns.

4. The DC motor according to claim 3, wherein the decreased number of turns of the inner coil is equal to the increased number of turns of the outer coil.

5. The DC motor according to claim 2, further comprising an armature, wherein the armature includes the core and a rectifier, wherein the rectifier includes a segment connected to the inner coil and a segment connected to the outer coil, and the stator includes a brush that slides in contact with the rectifier and supplies direct current to the inner coil and the outer coil.

* * * * *